(12) United States Patent
Alsadah et al.

(10) Patent No.: US 9,068,454 B1
(45) Date of Patent: Jun. 30, 2015

(54) METHOD FOR WIRE SAW EXCAVATION

(71) Applicant: KING FAHD UNIVERSITY OF PETROLEUM AND MINERALS, Dhahran (SA)

(72) Inventors: Jihad Hassan Alsadah, Dhahran (SA); Elsayed Ahamad Mogahed, Madison, WI (US)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 14/288,298

(22) Filed: May 27, 2014

Related U.S. Application Data

(63) Continuation-in-part of application No. 14/104,387, filed on Dec. 12, 2013, now abandoned.

(51) Int. Cl.
| | |
|---|---|
| *B28D 1/08* | (2006.01) |
| *B23D 57/00* | (2006.01) |
| *E21C 25/54* | (2006.01) |
| *E21C 25/56* | (2006.01) |
| *E21D 9/10* | (2006.01) |

(52) U.S. Cl.
CPC ............ *E21C 25/54* (2013.01); *B23D 57/0007* (2013.01); *B28D 1/088* (2013.01); *E21D 9/1053* (2013.01); *E21C 25/56* (2013.01)

(58) Field of Classification Search
CPC ......... E21C 25/54; E21C 25/56; B28D 1/088; E23D 57/0007; E23D 57/0084; E21D 9/1053
USPC .............................. 299/15, 35, 58; 125/16.02
See application file for complete search history.

(56) References Cited

U.S. PATENT DOCUMENTS

| | | | |
|---|---|---|---|
| 1,071,016 A * | 8/1913 | Ahearn ........................... 299/35 |
| 1,313,269 A * | 8/1919 | Custer ................................. 125/1 |
| 2,050,761 A * | 8/1936 | Newsom .......................... 299/15 |
| 3,451,722 A * | 6/1969 | Delisio et al. .................... 299/58 |
| 4,832,411 A | 5/1989 | Johnston et al. |
| 4,950,034 A | 8/1990 | Reid |
| 5,173,250 A * | 12/1992 | Ichikawa et al. ............... 376/310 |
| 8,534,765 B2 * | 9/2013 | Burger ............................. 299/58 |
| 2011/0192389 A1 * | 8/2011 | Jang ................................. 125/21 |
| 2011/0253121 A1 | 10/2011 | Park et al. |

\* cited by examiner

*Primary Examiner* — David Bagnell
*Assistant Examiner* — Michael Goodwin
(74) *Attorney, Agent, or Firm* — Richard C. Litman

(57) ABSTRACT

The method for wire saw excavation provides a significant savings in time, effort, and expense in the cutting of a core of material from a solid substrate such as rock or concrete. A single downhole is formed, and a robotic excavator then forms a continuous, closed loop base passage at the distal end of the downhole to define the periphery of the core to be cut. When the base passage has been completed, the robotic excavator is removed and two subsurface guide pulleys are placed in the bottom of the downhole. A wire saw is passed from a first surface pulley around the first and second subsurface pulleys and back to a second surface pulley. The surface pulleys are advanced along the predetermined periphery of the core at the same rate as the subsurface pulleys, so that the saw simultaneously cuts the periphery and the bottom of the core.

8 Claims, 16 Drawing Sheets

METHOD FOR WIRE SAW EXCAVATION

CROSS REFERENCE TO RELATED PATENT APPLICATION

This application is a continuation-in-part of U.S. patent application Ser. No. 14/104,387, filed on Dec. 12, 2013.

BACKGROUND OF THE INVENTION

1. Field of the Invention

The present invention relates generally to the excavation of solid substrates, and particularly to a method for wire saw excavation wherein a single downhole is formed into the substrate and a wire saw is used to cut a core from the substrate from the single downhole.

2. Description of the Related Art

A number of different methods have been developed in the past for earth excavation and tunneling. While the earliest tunnels and excavations were carried out using hand tools, a more practicable approach is by means of mechanized tools and equipment and/or the use of explosives. However, explosives can be difficult to control accurately, and not only destroy the core material being removed, but may also fracture and weaken the surrounding substrate. This requires considerably more time, effort, and cost to reinforce the weakened substrate around the hole formed by the detonated explosive charge. While mechanized equipment does not generally cause so much damage to the surrounding substrate, it generally results in the destruction of the core material. This may be an important consideration in such industries as granite quarrying and the like.

More recently, methods have been developed for the excavation of hard materials by means of wire saws. Wire saws comprise heavy cables having spaced cutting elements installed along the cables, which are driven by machinery similar to a chain saw or the like. Wire saws greatly reduce the damage both to the core and to the surrounding substrate (e.g., rock, concrete, etc.), reduce the energy expended during the excavation, and further reduce the time and effort required for creating the finalized shape of the excavation and/or core. However, conventionally it is necessary to bore or otherwise form a plurality of downholes into the substrate in order to introduce distal wire saw guides (pulleys, etc.) to the bottom of the intended excavation. The wire saw is then run around two or more such pulleys to make the cut in the substrate to form the core to be removed. The need for the formation of multiple downholes in the substrate requires significantly more time and effort than would otherwise be required if only a single downhole were needed.

Thus, a method for wire saw excavation solving the aforementioned problems is desired.

SUMMARY OF THE INVENTION

The method for wire saw excavation greatly reduces the time, effort, and expense of conventional wire saw excavation methods and procedures by requiring the drilling or forming of only a single downhole in the substrate. The shape of the desired excavation is initially determined on the face of the substrate (e.g., rock, concrete, etc.) to be cut, and the single downhole or guide hole is formed at some point along the periphery of the shape or mass to be cut from the substrate. The downhole may be formed by conventional boring or drilling, or by means of a micro-excavator. Such a micro-excavator may be a reduced scale version of larger tunnel boring machines, rock drills, and the like, capable of forming a hole having a diameter on the order of only four to ten inches (ten to twenty-five centimeters).

Once the downhole or guide hole has been completed to its desired final depth a robotic excavator is placed at the hole, and the excavator proceeds down the hole under its own power. The robotic excavator may be the same machine as the micro-excavator. The robotic excavator is programmed to form a base passage congruent to the initially determined periphery of the core to be cut from the substrate. The robotic excavator completes this base passage, returning to the bottom of the downhole and thus forming a continuous base passage from the bottom of the downhole. The micro-excavator is then withdrawn from the previously formed single downhole.

At this point, two robotic guide pulleys are sent down the single downhole so that one pulley travels in each direction into the base passage from the bottom of the downhole as the cut is made. The two pulleys carry the wire saw cutting element with them. There are two different methods that may be used to cut the core from the volume defined by the downhole and base passage, as described below.

The first method uses two robotic guide pulleys positioned at the bottom of the downhole to travel in opposite directions through the base passage. The wire saw passes around these two robotic pulleys, and cuts in a plane across the base passage as the two robotic pulleys advance in opposite directions along the base passage. Alternatively, one pulley may be stationary while the other pulley travels along the base passage. The wire saw does not extend up the downhole during this portion of the cutting process using this method, and no cutting of the peripheral shape of the core is accomplished at this point. Once the bottom cut has been accomplished as described immediately above, the wire saw is positioned about a surface pulley and a subsurface pulley at the bottom of the downhole. The two pulleys are advanced along the predetermined path for the peripheral cut in order to complete the cut. Alternatively, two surface pulleys and two subsurface pulleys may be used to cut in opposite directions along the predetermined path, thereby accelerating the cutting process.

In the second method, both the bottom cut and the peripheral cut are made simultaneously. The wire saw element passes over or around a first surface pulley, down the guide hole, around or over a first subsurface pulley, and thence around or over a second subsurface pulley and back up the downhole to pass over or around a second surface pulley. As the cutting process advances, the surface pulleys and subsurface pulleys are advanced along the previously determined periphery of the core being cut, the wire saw element extending along the two opposite kerfs being formed between the surface and the base passage. The surface pulleys are advanced along the intended periphery of the core being cut at the same rate as the subsurface pulleys within the base passage. This method or technique provides for the cutting across the base of the core simultaneously with the cutting of the sides of the core. Also, it will be seen that the process is not limited to circular sections or cylindrical shapes. The robotic excavator used to form the base passage may be programmed to excavate a base passage of any practicable shape or configuration, as desired.

When the cuts have been completed, the core is unattached to any of the structure of the substrate. At this point, the two subsurface pulleys are removed through the single downhole and a mechanism is sent down the hole to push the core from the completed hole. A traction device may be attached to the face of the cut core in lieu of or in addition to the pusher device, if desired. The moving of the core at least slightly outward from the substrate provides some working room behind the core to allow guide pulleys to be positioned in this volume behind the core. This allows the core to be sectioned into multiple pieces to facilitate removal. The core sectioning process is accomplished in much the same manner as that described further above for cutting the core from the substrate.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The method for wire saw excavation according to the present invention requires only a single downhole to be drilled or otherwise formed into the substrate from which a core of material is to be cut and removed. The requirement for only a single downhole greatly reduces the time, effort, and cost involved in the extraction of a core of material from a hard substrate, such as solid rock or concrete. Moreover, the resulting solid core may be extracted in blocks or other forms having economic value. For example, when marble material is cut, the core may be removed as a solid marble block and used to form building material, for sculpture, etc.

Figure 1:
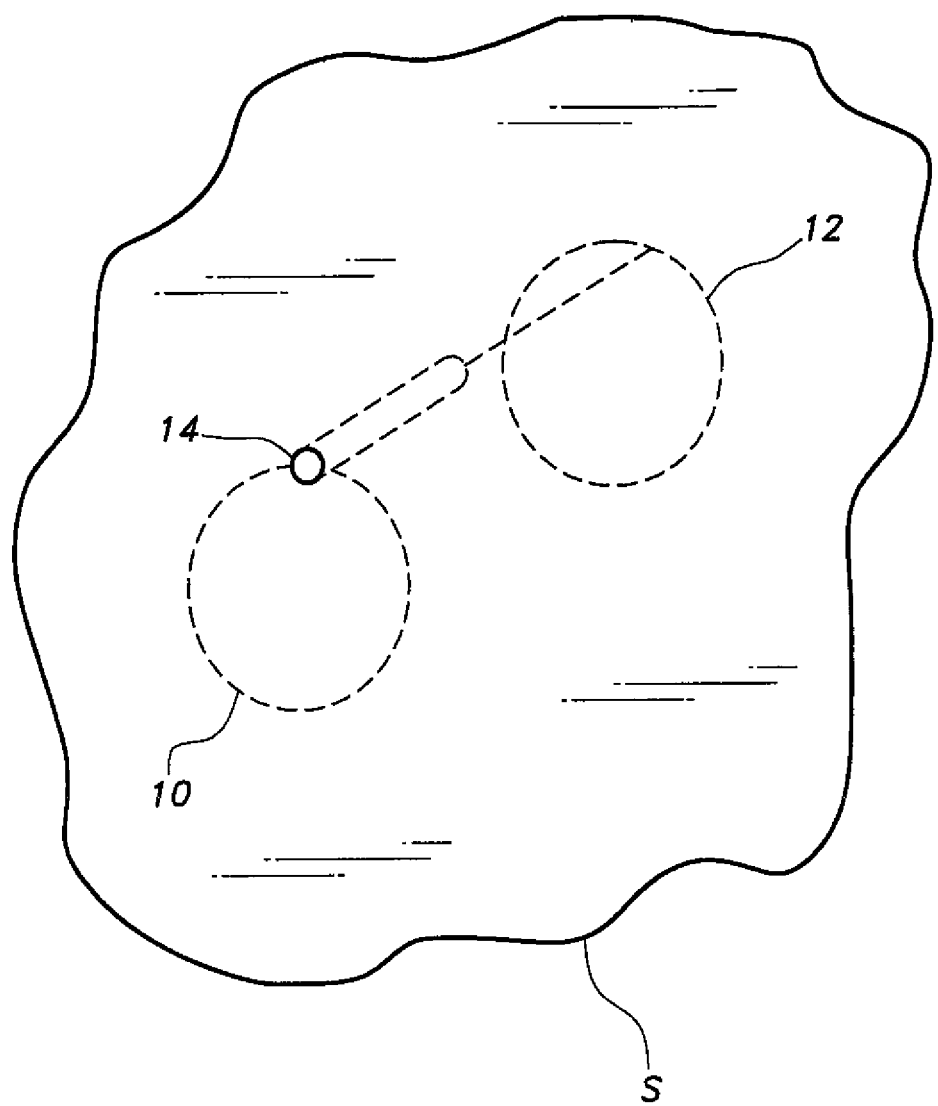
FIG. 1 is a schematic perspective view of the initial step in a method for wire saw excavation according to the present invention, showing the partially formed single downhole.

FIG. 1 of the drawings provides a schematic perspective view of a planned core cut and extraction from a substrate S. The initial step in the core cutting and extraction method is illustrated in FIG. 1, i.e., the shape of the periphery of the core to be cut has been indicated both on the face of the substrate (as indicated by the dashed circle 10) and also within the substrate at the depth of the bottom of the core to be cut (as indicated by the dashed circle 12). In the example shown in the drawing, the circular peripheries 10 and 12 define a cylindrical shape therebetween, although the method is not limited to cutting cylindrical cores, but may extend to conical cores, polygonal cores, and cores with non-parallel opposing end surfaces. The surface periphery 10 is shown in broken lines at this point in the process to indicate that this cut has not yet been made. The single downhole 14 required for the wire saw excavation method according to the present invention has also been started, with about half of the final depth of the downhole 14 being shown in FIG. 1.

Figure 2:
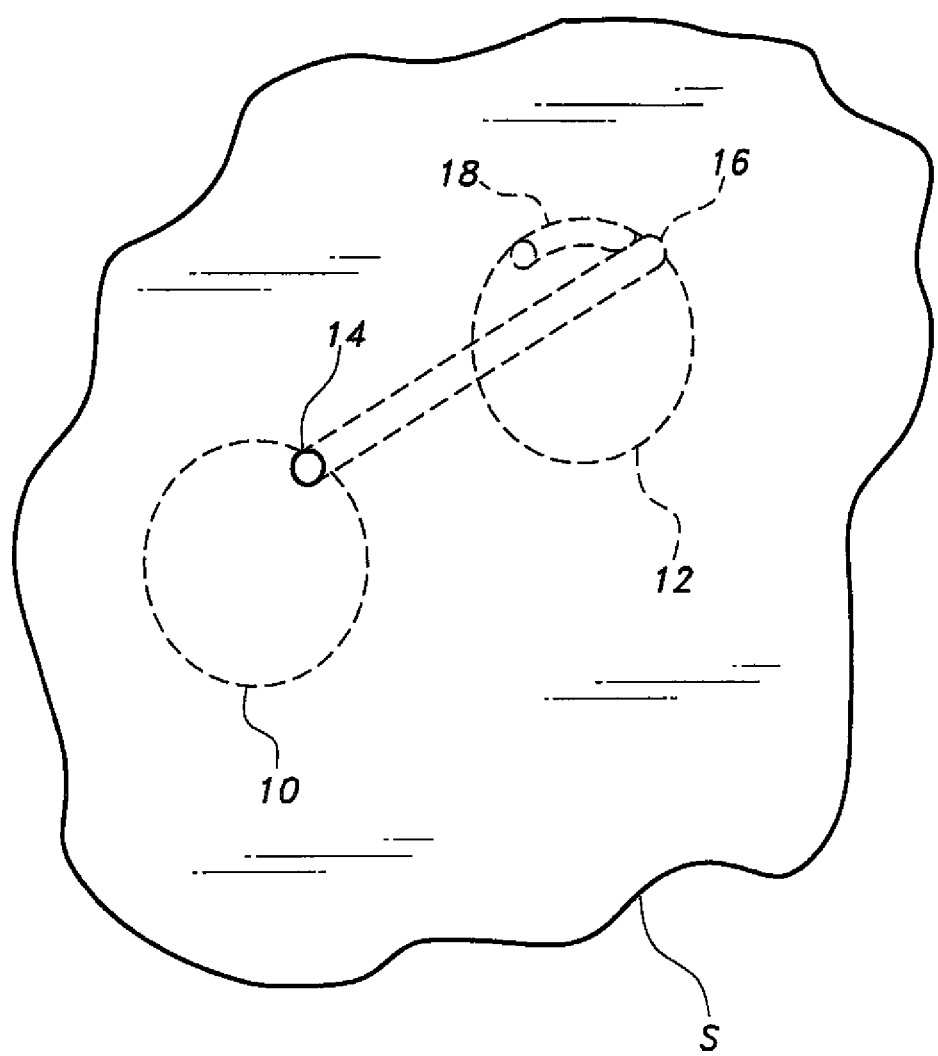
FIG. 2 is a schematic perspective view of the second step in the method for wire saw excavation according to the present invention, showing the completed downhole and the partially completed peripheral bottom hole.

In FIG. 2 it will be seen that the downhole 14 has been formed to its completed length or depth. The distal end 16 of the downhole 14 is at the depth of the planned base periphery 12 within the substrate S. When the downhole 14 has been completed, the cutting or boring tool (e.g., rock drill, micro-excavator, etc.) is withdrawn from the downhole 14 and a robotic micro-excavating tool is lowered to the distal end 16 or base of the downhole 14. The robotic excavator is programmed to follow the predetermined peripheral shape or pattern 12 of the core to be cut and removed from the substrate. FIG. 2 also shows the formation of the first portion of the base passage 18 being cut or formed by the robotic micro-excavator. About one quarter of the base passage 18 has been formed to the extent of the operation shown in FIG. 2.

Figure 3:
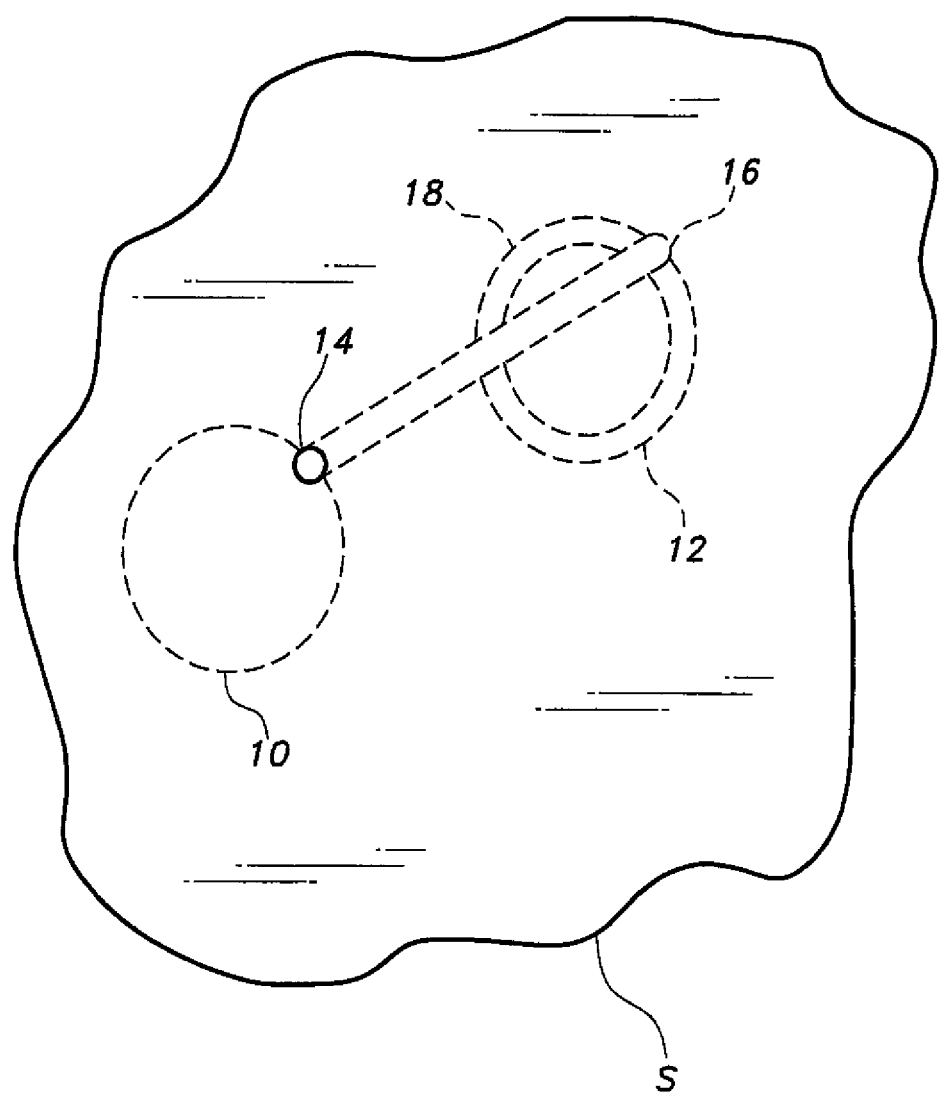
FIG. 3 is a schematic perspective view of the third step in the method for wire saw excavation according to the present invention, showing the completed downhole and completed peripheral bottom hole.

In FIG. 3 of the drawings the base passage 18 is shown as having been completed, as indicated by the complete toroidal path of the base passage 18. The robotic micro-excavator will always form a closed passage, i.e., a passage having its starting point and its final end point at the same location at the distal end 16 of the downhole 14. It is again noted that while the base passage 18 has followed the circular base periphery 12 previously planned, the base periphery and corresponding base passage need not be circular, but may comprise any practicable form or shape according to the shape of the desired core to be cut and the corresponding programming of the robotic micro-excavator used to form the base passage 18.

Figure 4:
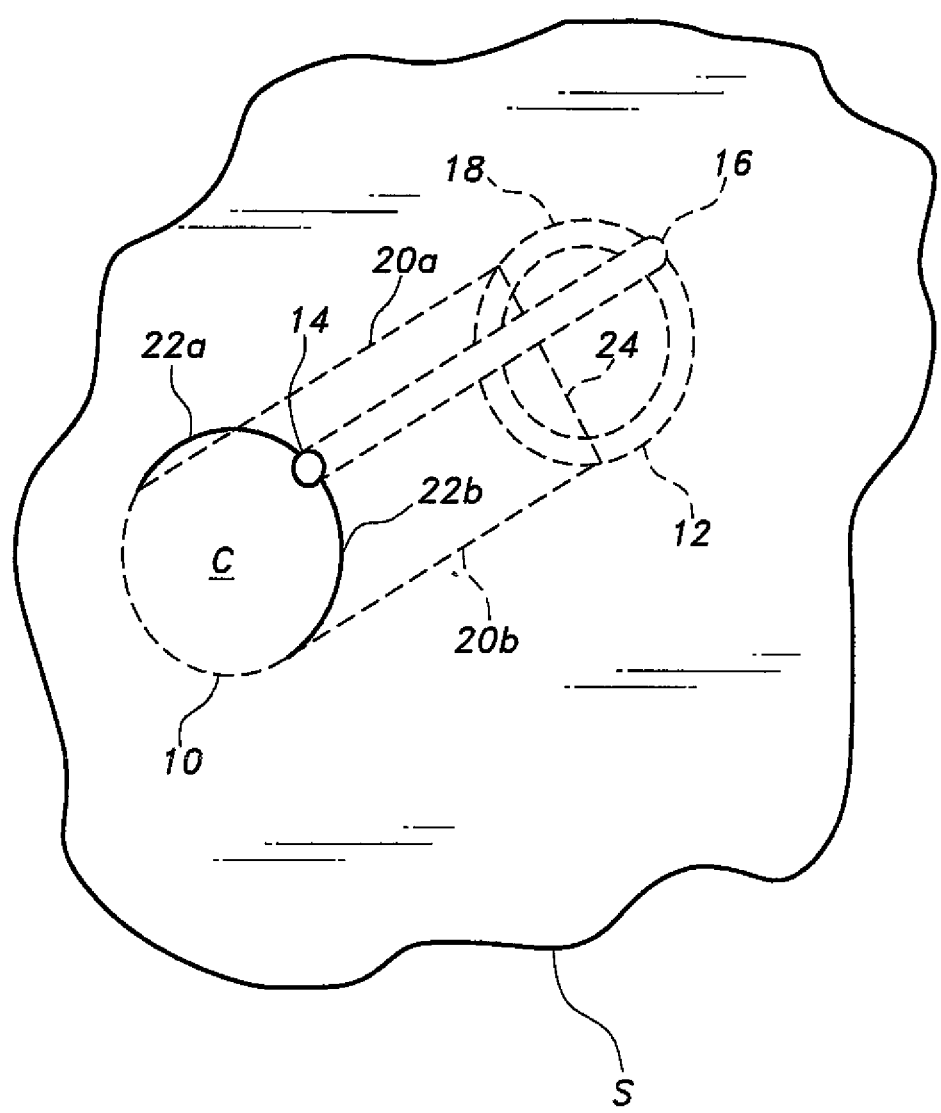
FIG. 4 is a schematic perspective view of the fourth step in the method for wire saw excavation according to the present invention, showing partial completion of the peripheral cut between the surface and the bottom hole and across the bottom hole.

FIG. 4 of the drawings illustrates the next step in the process, i.e., the initial formation of the peripheral cuts of the core C from the substrate S. Once the base passage 18 has been formed, as shown in FIG. 3, and the robotic micro-excavator has been removed through the single downhole 14, a pair of robotic guide pulleys is lowered through the downhole 14 to its distal end 16 and juncture with the previously completed base passage 18. These first and second subsurface pulleys also carry a portion of an endless loop of flexible wire saw into the downhole 14 as they descend. The wire saw loop also passes around corresponding first and second surface guide pulleys, as well as through a drive mechanism to actuate the wire saw. The first and second surface pulleys are positioned to each side of the surface of the downhole 14. The two subsurface pulleys are correspondingly positioned at the juncture of the distal end 16 of the downhole 14 and the completed base passage 18.

The drive mechanism for the wire saw is started once the pulleys have been positioned, and the first and second subsurface pulleys are robotically driven into the base passage 18. Simultaneously, the first and second surface pulleys are robotically driven in opposite directions along the previously determined path of the surface periphery 10 defining the shape of the core C. FIG. 4 illustrates this peripheral cutting process at about its half completed state. The limits 20a and 20b of the mutually opposed partially completed peripheral cuts are shown in broken lines, and their surface counterpart kerfs 22a and 22b are shown in solid lines. As the wire saw extends from a first surface pulley down to a first subsurface pulley, then across to the second subsurface pulley and back up to the second surface pulley, it will be seen that simultaneous with the forming of the opposed peripheral cuts 20a and 20b, a base cut 24 will be formed, as shown by the broken line extending as a secant across the base passage 18. Thus, the forming of two mutually opposed peripheral cuts 20a and 20b enables the base cut 24 to be formed simultaneously, which doubles the overall speed of the cutting process, as opposed to cutting the periphery in only one direction.

Alternatively, the cutting process may comprise only one of the subsurface pulleys proceeding around the base passage 18, while the other subsurface pulley remains at the juncture of the downhole and base passage. The result will ultimately be the same, but the cutting process may take more time, since only one of the subsurface pulleys is in motion during the cutting process. Also, it will be noted that this cutting of the base may be conducted as a separate operation from the cutting of the periphery, as described further above.

Figure 5:
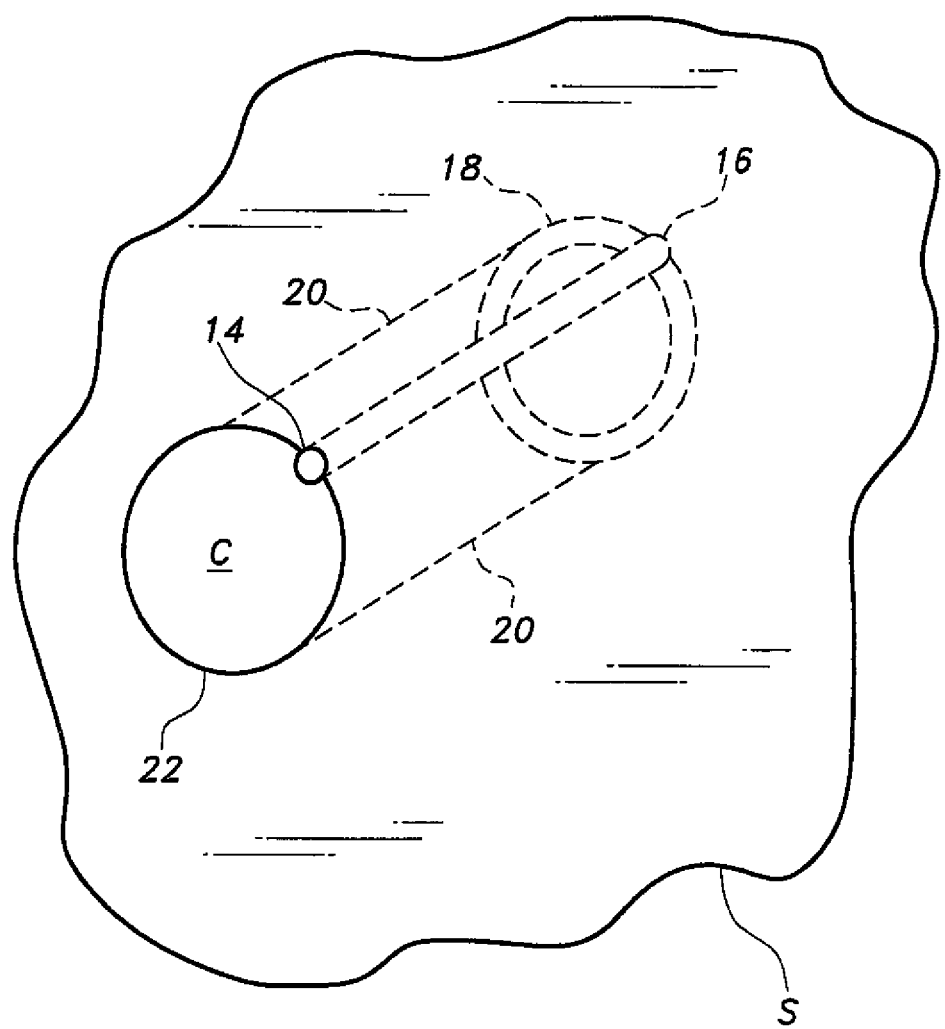
FIG. 5 is a schematic perspective view of the fifth step in the method for wire saw excavation according to the present invention, showing completion of the peripheral cut between the surface and the bottom hole and across the bottom hole.

As the above cutting operation nears its completion and the first and second pulleys meet one another diametrically opposite their starting points, one of the pulleys of each set, e.g., the first subsurface pulley and the first surface pulley, will back around its previous path to allow its opposite pulley to complete the final short remaining cut. The result will be as represented in FIG. 5 of the drawings, i.e., a completely cylindrical cut 20 has been formed and the surface kerf 22 forms a complete closed shape.

Figure 6:
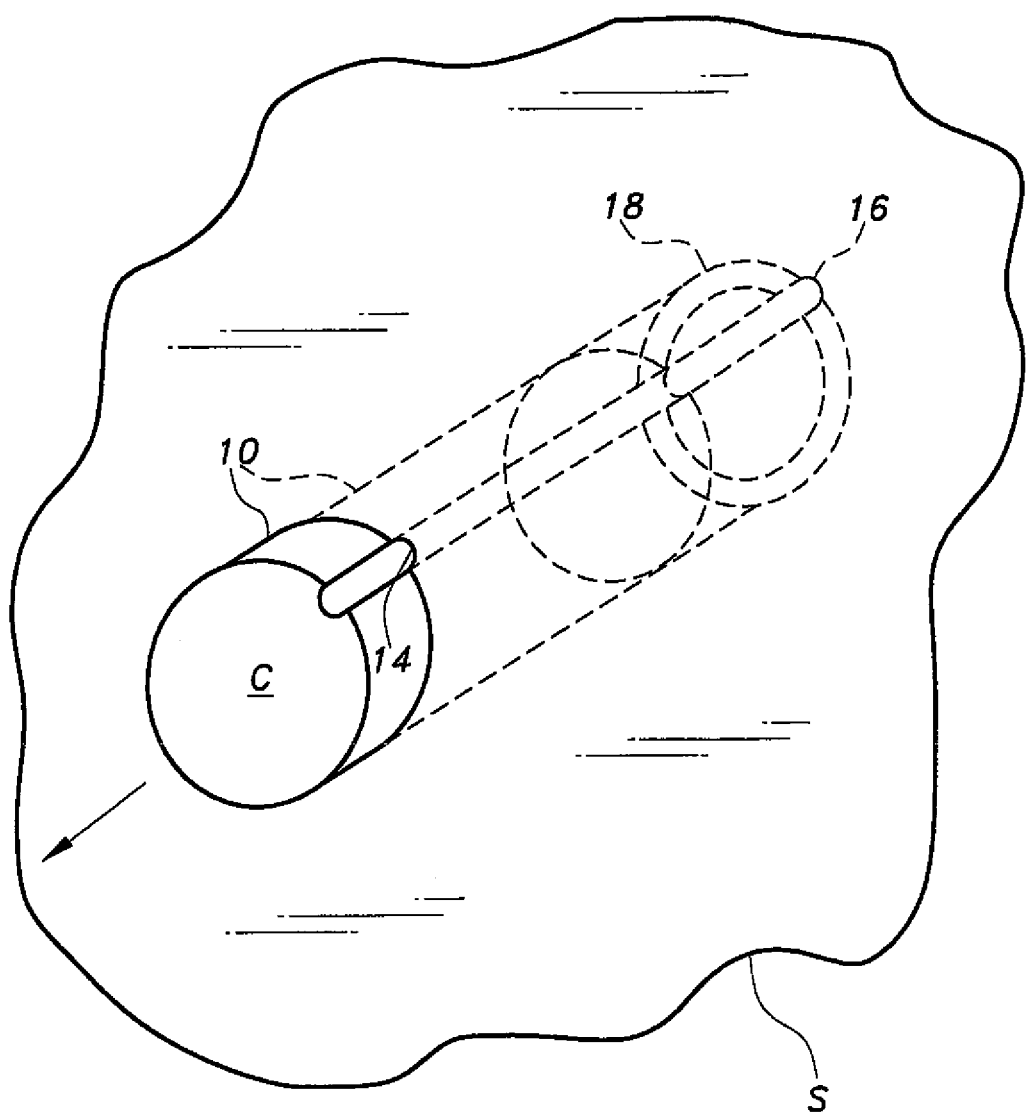
FIG. 6 is a schematic perspective view of the sixth step in the method for wire saw excavation according to the present invention, showing the partial extraction of the core from the completed hole.

At this point, the core C is completely free of attachment to the surrounding substrate S, and may be extracted, as shown in FIG. 6 of the drawings. Extraction of the core C from the substrate S may be accomplished by compressively pushing the core C from the bottom of its hole by the introduction of one or more robotic devices through the downhole 14, or alternatively, by attaching a traction device to the face of the core C to pull it from the hole, or a combination of both techniques. Alternatively, the core C may be sectioned or cut further into segments prior to extraction by using the wire saw techniques described further above in order to facilitate its removal.

Figure 7A:
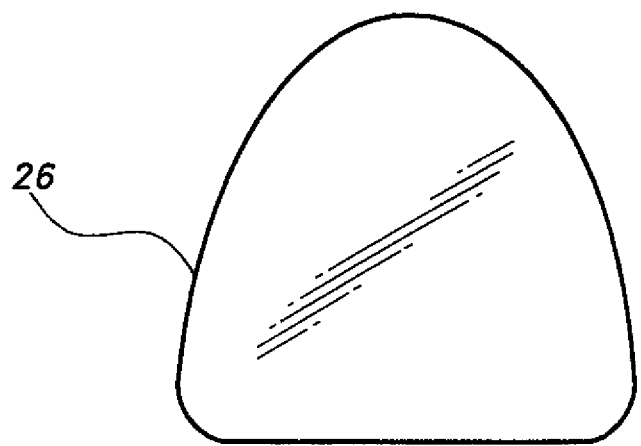
FIGS. 7A, 7B, 7C, and 7D are plan views of exemplary core shapes that may be cut according to the method for wire saw excavation according to the present invention.
Figure 7B:
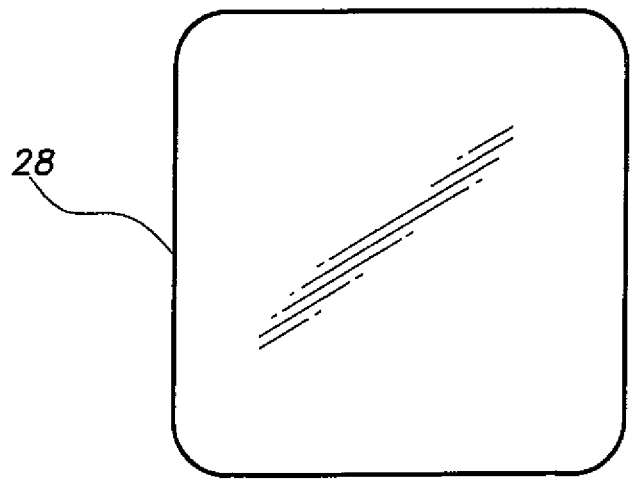
Figure 7C:
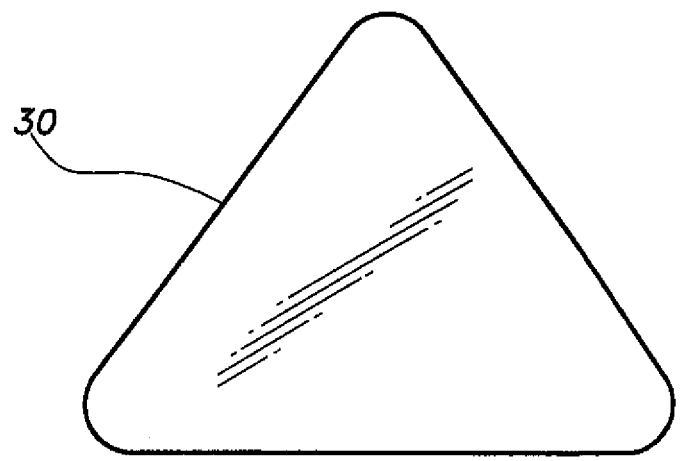
Figure 7D:
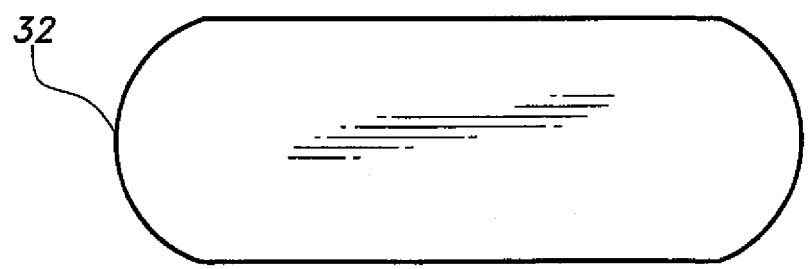

It will be seen that the peripheral shape of the core being cut from the substrate need not be circular, as shown in the exemplary FIGS. 1 through 6. Rather, a core having any desired sectional shape may be cut using the present method. FIGS. 7A through 7D provide illustrations of different non-circular shapes that may be formed using the present method. FIG. 7A illustrates a peripheral shape 26 having a generally parabolic upper portion and a flat lower portion or floor. Such a configuration is often desirable in the construction of tunnels, where the parabolic arched upper portion is more resistant to collapse than most other shapes. FIG. 7B illustrates a substantially square or rectangular peripheral shape 28 having rounded corners. FIG. 7C illustrates a substantially triangular peripheral configuration 30, also having rounded corners. The corners of any of the shapes or configurations may be formed to be more squared off, if desired. FIG. 7D illustrates an oval shape 32, i.e., two flat sides joined at their ends by semicircular arcs. It should be noted that the core shapes 26 through 32 illustrated in FIGS. 7A through 7D are exemplary, and that any desired core shape may be cut or formed using the single downhole excavation method according to the present invention, including cores with non-parallel opposing end faces and opposing end faces having different dimensions from each other.

Figure 8:
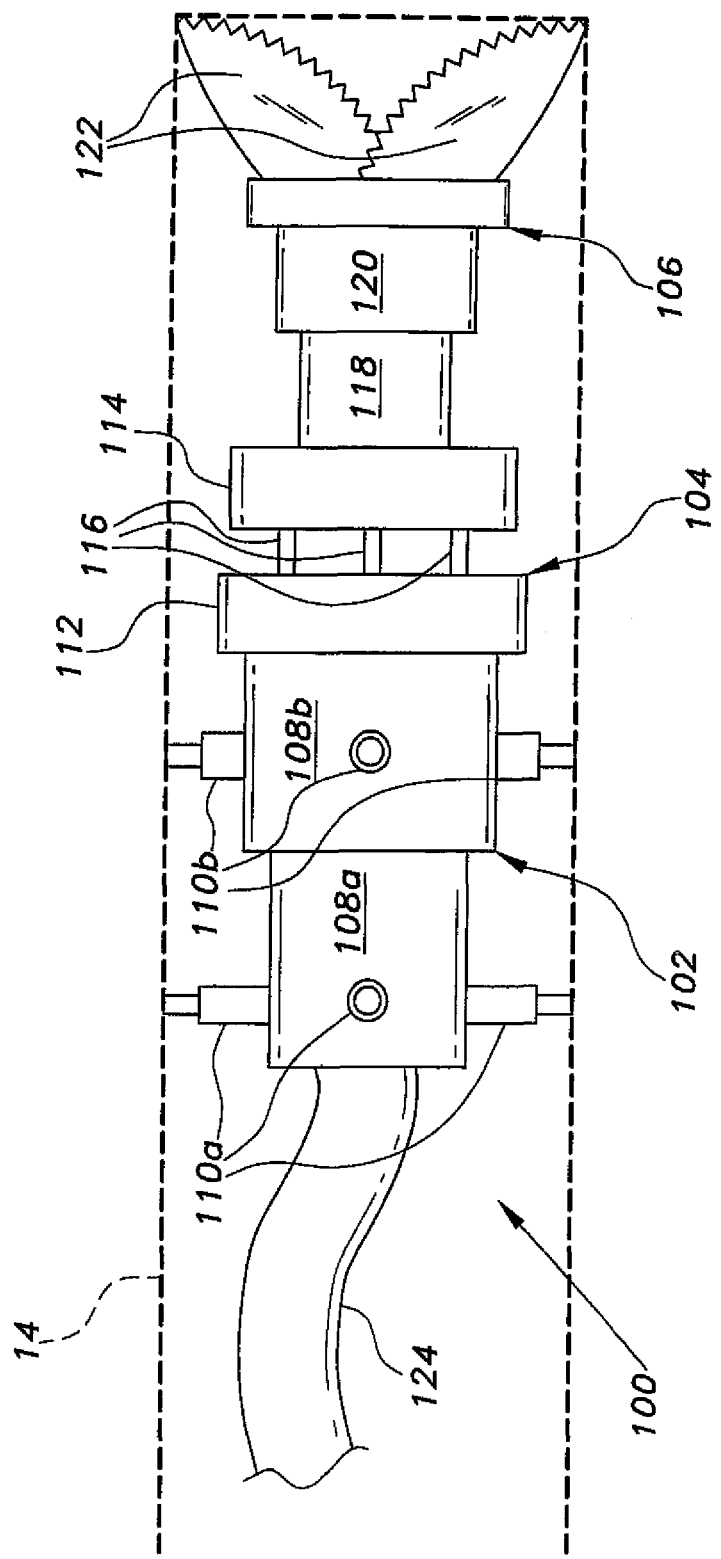
FIG. 8 is a schematic side elevation view of a boring tool for use with the method for wire saw excavation according to the present invention.
Figure 9:
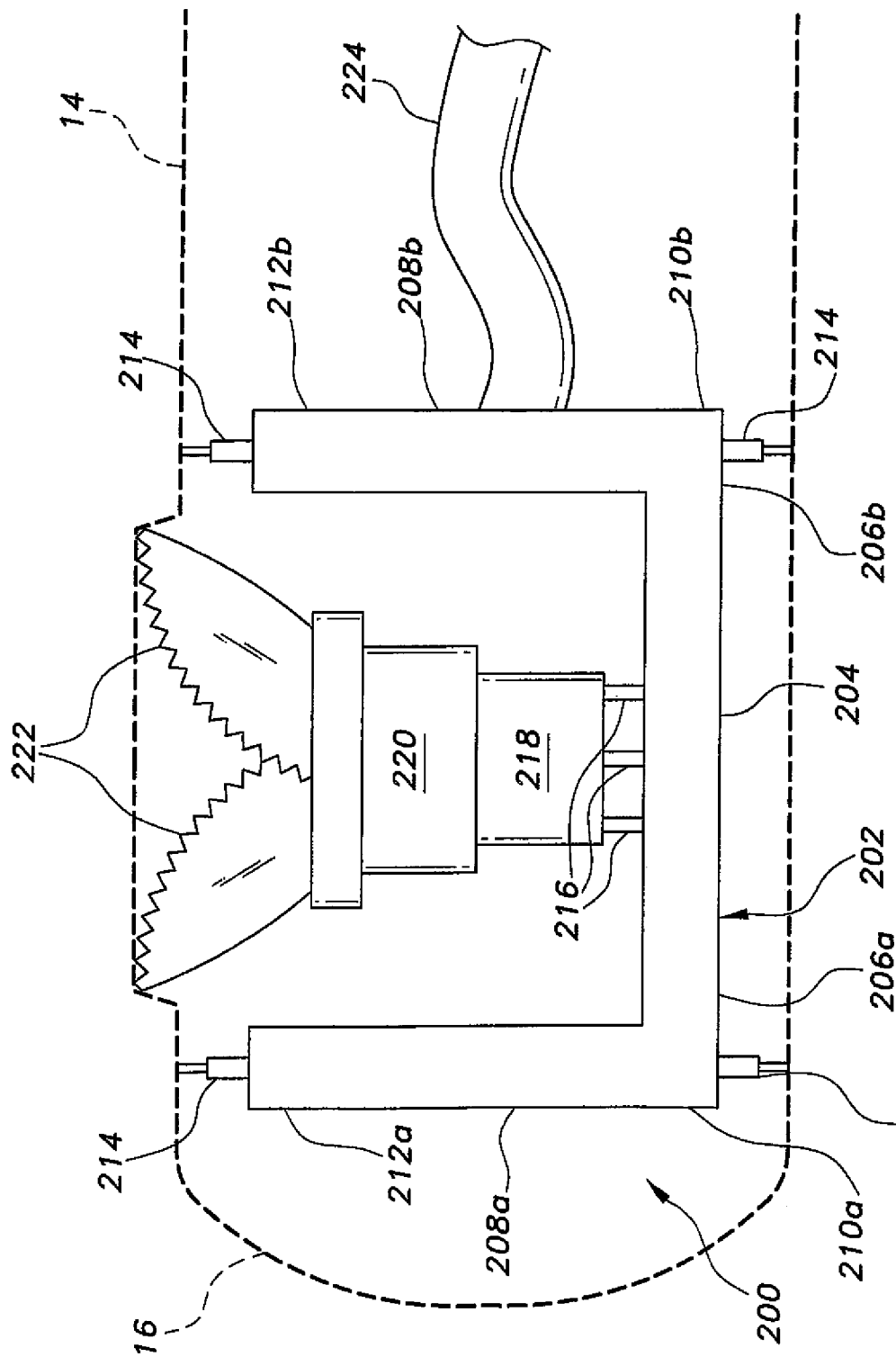
FIG. 9 is a schematic side elevation view of another boring tool for use with the method for wire saw excavation according to the present invention.
Figure 10:
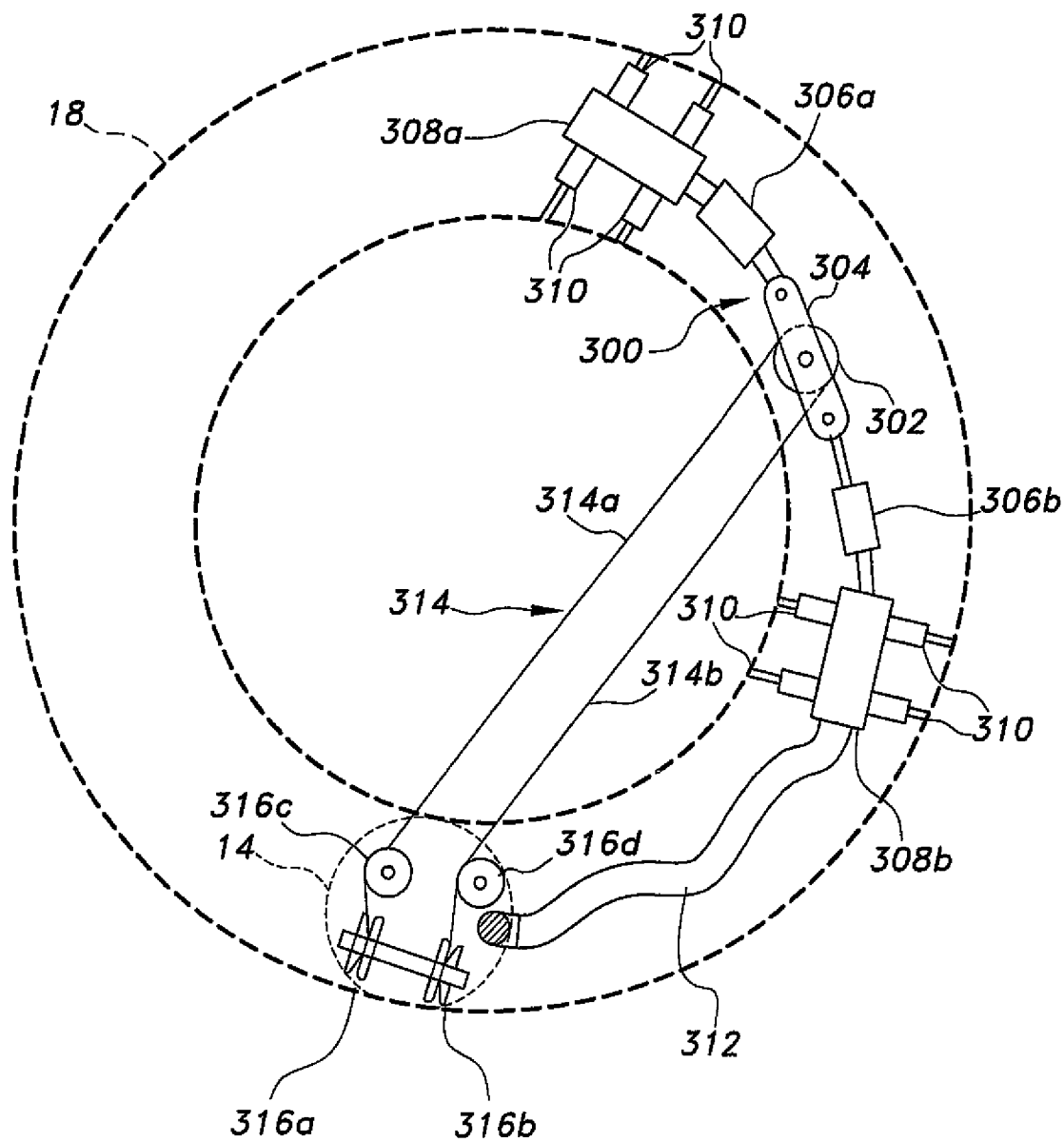
FIG. 10 is a schematic elevation view of a wire saw cutting apparatus for use in forming the base cut in the method for wire saw excavation according to the present invention.
Figure 11:
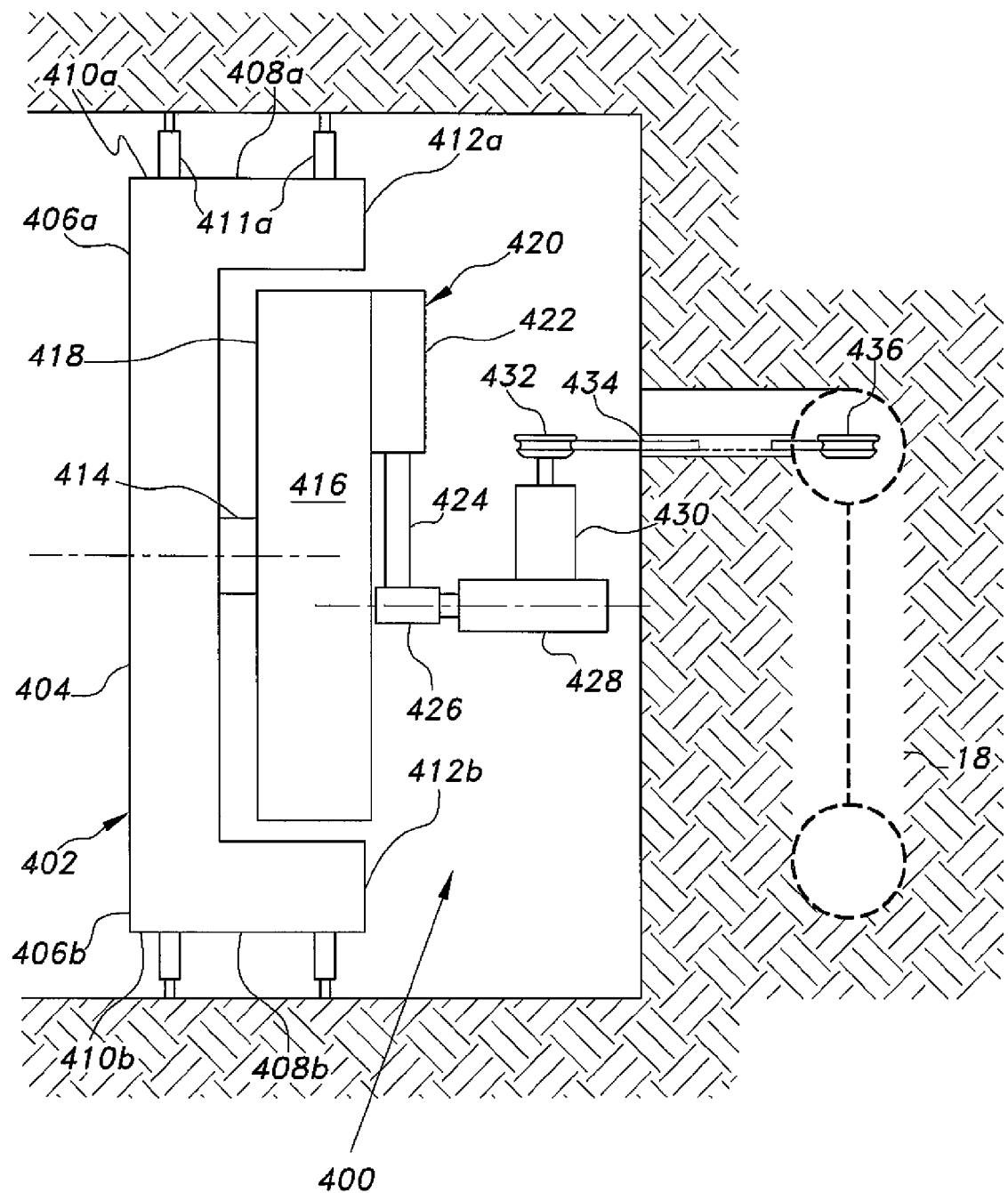
FIG. 11 is a schematic side elevation view of a wire saw cutting apparatus for use in forming the peripheral cut of the method for wire saw excavation according to the present invention.
Figure 12A:
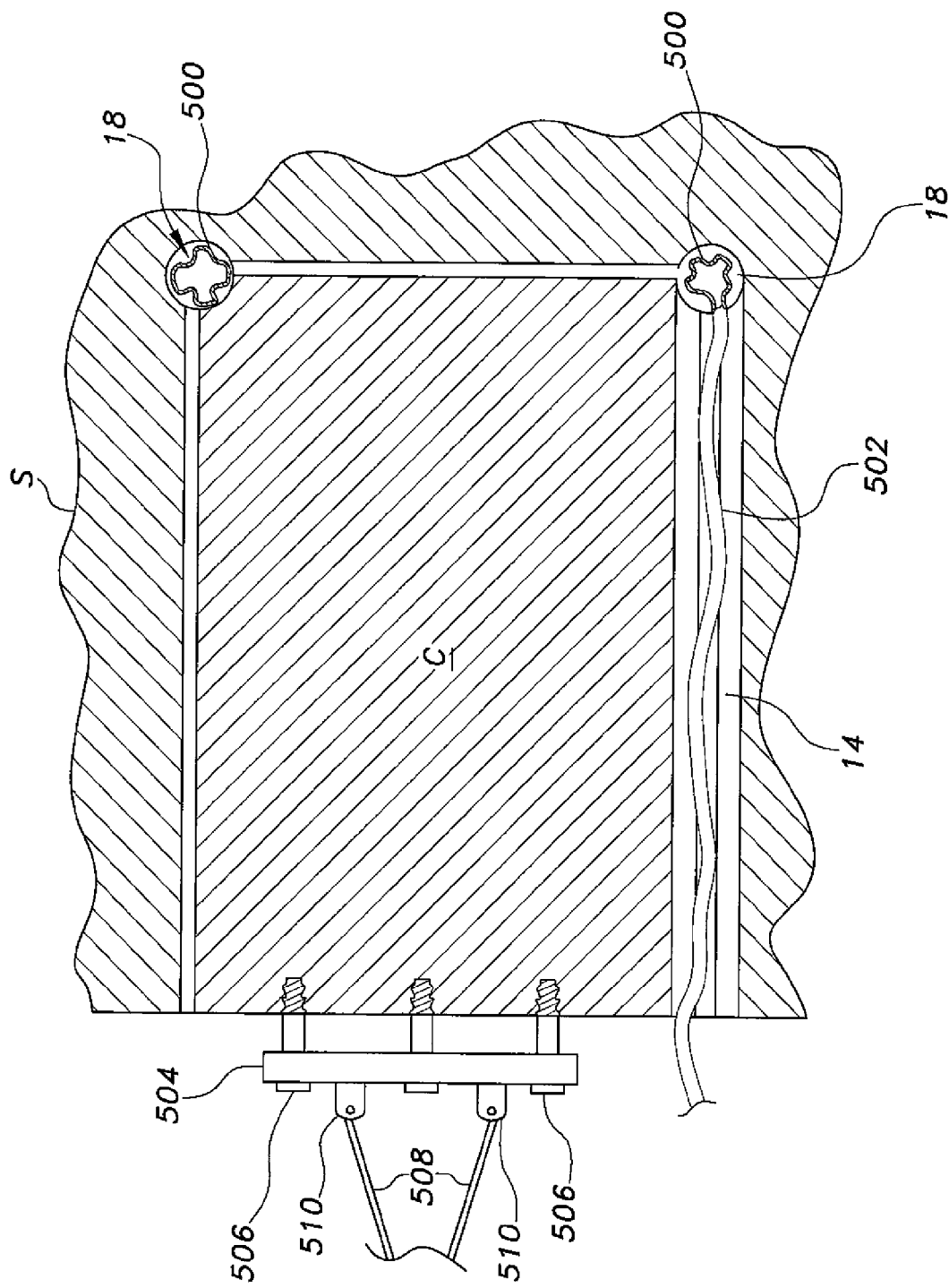
FIGS. 12A and 12B are environmental side elevation views in section showing the apparatus used in the extraction of a core of material cut from a substrate in a method for wire saw excavation according to the present invention.
Figure 12B:
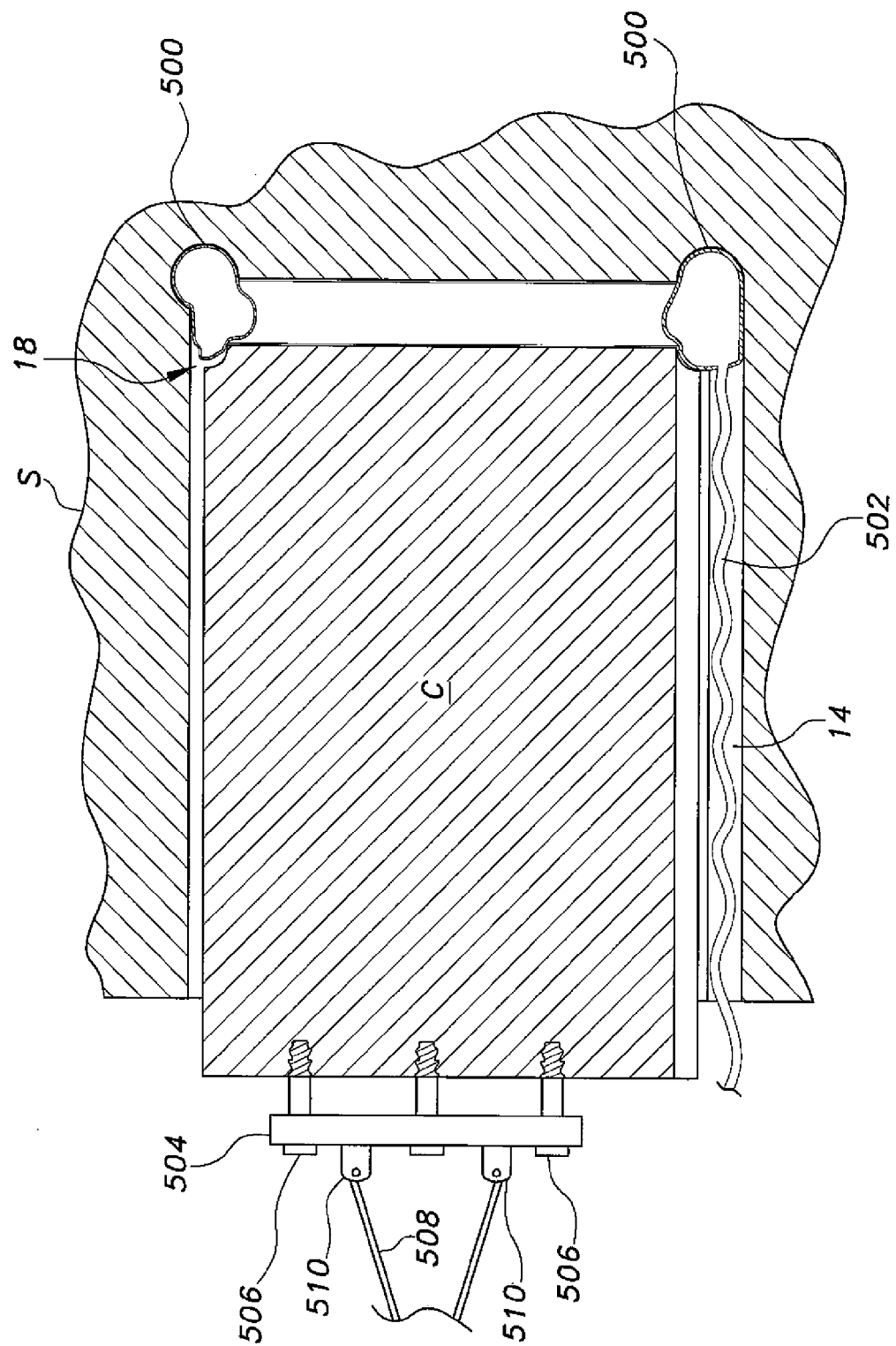
Figure 13:
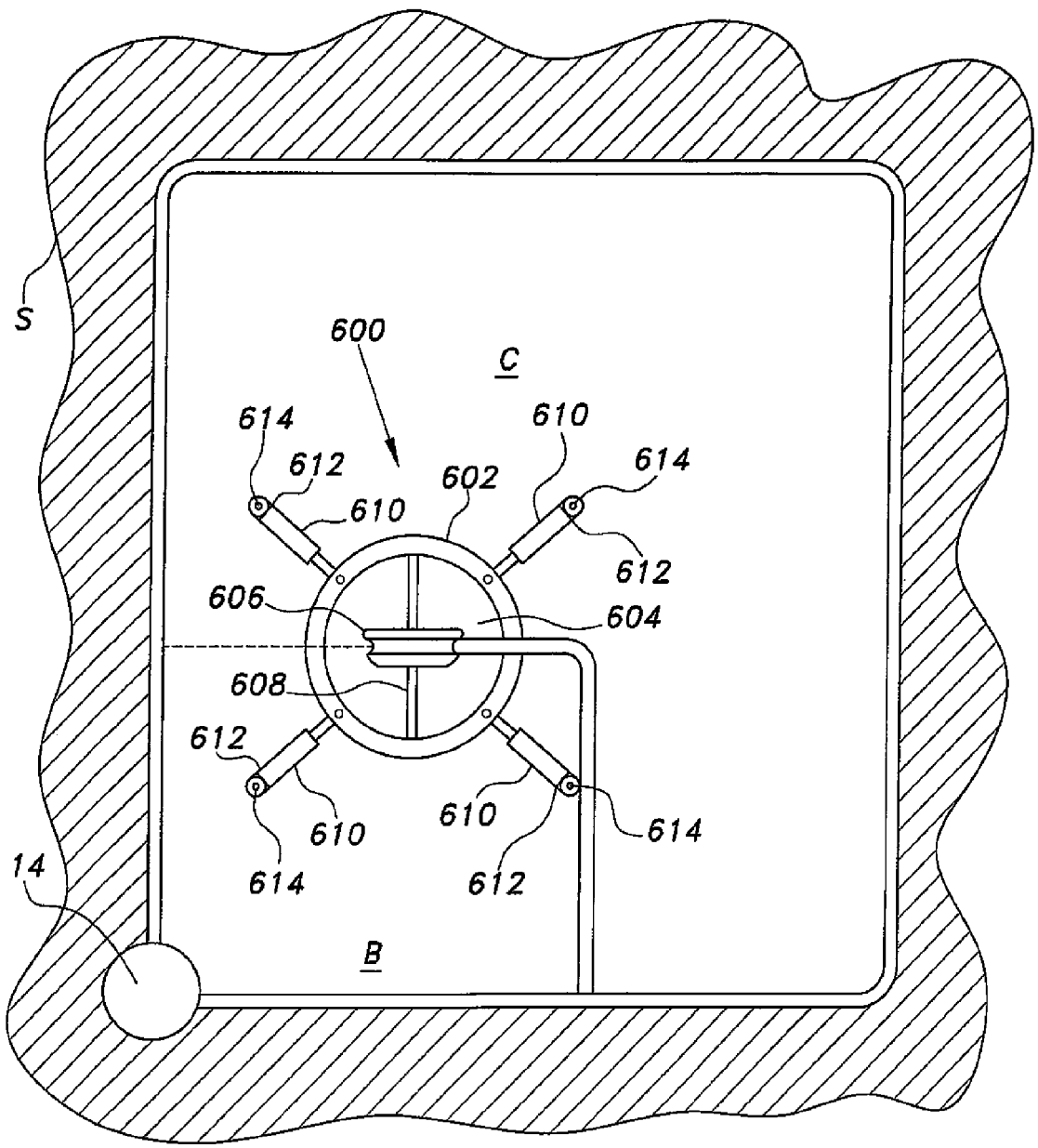
FIG. 13 is an environmental elevation view showing another wire saw cutting tool for cutting a smaller section from the core material in a method for wire saw excavation according to the present invention.
Figure 14:
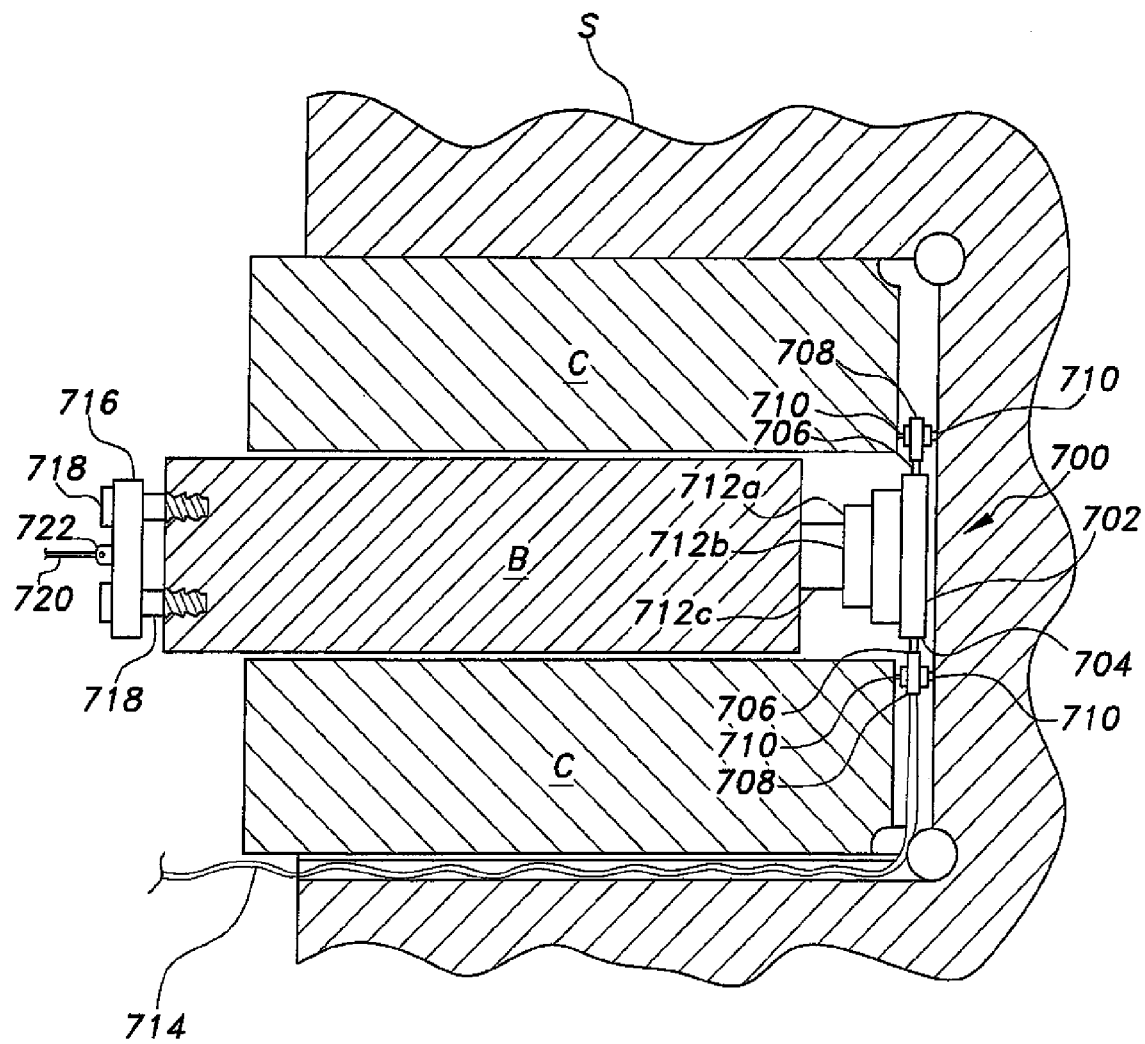
FIG. 14 is an environmental side elevation view in section showing another apparatus for use in extracting a previously cut smaller section from the core material in a method for wire saw excavation according to the present invention.

FIGS. 8 through 14 illustrate various devices and mechanisms that may be used to perform the excavation methods described above. Taken collectively, the devices described in FIGS. 8 through 14 describe a kit of apparatus for performing wire saw excavation according to the present method described in FIGS. 1 through 6. FIG. 8 describes a boring machine for forming the downhole and the base passage, once initiated. FIG. 9 describes a robotic excavator for at least initiating the base passage. FIG. 10 describes an apparatus for making the base cut. FIG. 11 describes an apparatus for making the peripheral cut between the base cut and the surface. FIGS. 12A and 12B describe an apparatus for removing the core from the substrate. FIG. 13 describes an apparatus for sectioning the core into smaller blocks before its removal from the substrate. FIG. 14 describes an apparatus for extracting the smaller block from the core before removal of the core from the substrate. The above apparatus cooperate to enable practicing the method illustrated in FIGS. 1-6, thereby forming a kit.

The apparatus 100 of FIG. 8 is a robotic device used to form the single downhole in starting the excavation, as well as the greater portion of the base passage formed at the interior end of the material to be cut or excavated from the substrate. The apparatus 100 comprises three portions: (1) an anchoring and movement portion 102; (2) a steering assembly 104; and (3) a drilling or cutting portion 106. The anchoring and movement portion 102 includes a first drive component 108a and a second drive component 108b telescoping concentrically around the first drive component 108a. Each of the drive components 108a, 108b has a plurality of telescoping anchor struts 110a, 110b extending radially therefrom. The anchor struts 110a, 110b selectively extend from their respective drive components 108a, 108b to lock against the wall of the downhole 14, thereby preventing movement of the respective drive components 108a, 108b. In operation, the first anchor struts 110a are extended to lock the first drive component 108a in position, while the second anchor struts 110b are retracted to allow movement of the second drive component 108b. The second drive component 108b is then extended relative to the first drive component 108a, thereby driving the steering assembly 104 and the drilling or cutting portion 106 forward. The anchor struts 110b of the second drive component 108b are then extended to anchor the second drive component 108b in place in the downhole 14. The anchor struts 110a of the first drive component 108a are then retracted to allow the first drive component 108a to move, and the first drive component 108a is partially retracted into the second drive component 108b. The anchor struts 110a of the first drive component 108a are then extended to lock the first drive component 108a in the downhole 14. The above-described cycle is repeated as necessary to advance the downhole drilling apparatus 100 along the downhole 14.

The steering assembly 104 comprises a base 112, a steering head 114, and a plurality of axially oriented, selectively telescoping steering legs 116 extending between the base 112 and the steering head 114. The steering legs 116 may be actuated independently of one another to change the angle of the steering head 114 relative to the base 112, thus angling the steering head 114 to change the direction of advance of the drilling and cutting portion 106 to alter the direction of the downhole 14 as needed. As an example of this operation, if the lower steering leg 116 is retracted and the upper steering leg 116 is extended, the result will be to tilt the steering head 114 and its concentric drilling and cutting portion 106 downward relative to the position shown in FIG. 8, thus resulting in the forwardmost portion of the downhole 14 changing direction toward the lower portion of the drawing. The adjustments of the steering legs 116 are typically relatively small, producing minor corrections in the orientation of the downhole 14 and preventing the downhole 14 from proceeding in an undesired direction.

The cutting or drilling portion 106 comprises a base 118 and rotary cutting head drive 120 extending concentrically from the steering head 114 opposite the steering legs 116, and a drill head assembly 122 extending concentrically from the cutting head drive 120 opposite the steering head 114 and selectively driven by the assembly 122. The entire apparatus 100 receives control signals, hydraulic or other power as appropriate, and lubricant and/or debris flushing media (e.g., drilling "mud") through a cable 124 that extends from the operating system at the surface to the first drive component 108a. The apparatus 100 is preferably hydraulically powered, but electrical or pneumatic power may be used with appropriate mechanisms in the apparatus 100. Another drive possibility is the use of direct rotational drive, as in twisted chains.

It will be noted that the passage being formed during the excavation process must make a relatively abrupt change in direction of about 90° at the base 16 of the downhole 14 to initiate formation of the base passage 18. This is accomplished by means of a lateral cutting apparatus or assembly 200, as shown in FIG. 9 of the drawings. The lateral cutting assembly or apparatus 200 includes a frame 202 comprising a central portion 204 having mutually opposed first and second ends 206a, 206b having mutually opposed first and second arms, 208a, 208b extending orthogonally from the respective central portion ends 206a, 206b. Each of the arms 208a, 208b has a first end 210a, 210b attached to the corresponding central portion ends 206a, 206b, and an opposite second end 212a, 212b.

Each end of each arm 208a, 208b has a selectively telescoping anchor strut 214 extending therefrom that is oriented axially relative to its respective arm. The four anchor struts 214 operate substantially in the same manner as described further above for the anchor struts 110a, 110b of the downhole drilling apparatus 100 of FIG. 8 to lock the lateral cutting apparatus 200 immovably in the end of the downhole 14.

At least one, and preferably, a plurality of selectively telescoping rams 216 extend from the central portion 204 of the frame 202 between and substantially parallel to the arms 208a and 208b. These rams 216 support a lateral cutting head base 218 extending therefrom. The cutting head base 218 thereby extends outward from and retracts inward toward the central portion 204 of the frame 202. A rotary cutting head drive 220 is mounted on the base 218 opposite the ram or rams 216. The cutting head drive 220 supports a drill head assembly 222 extending concentrically therefrom between the second ends 212a, 212b of the two arms 208a, 208b opposite the ram(s) 216. A cable 224 extends from the frame 202 to supply electrical, hydraulic, and/or other power and control signals to the lateral cutting assembly 200, substantially in the same manner described further above for the cable 124 of the downhole drilling apparatus 100 of FIG. 8.

The lateral cutting assembly 200 is positioned at the base 16 of the downhole 14 by pushing or sliding the device through the previously completed downhole 14. When the assembly 200 reaches the desired position at the base 16 of the downhole 14, the anchor struts 214 are extended to lock the lateral cutting assembly 200 in position. Appropriate sensors in the assembly 200 register the orientation of the device to enable the assembly 200 to be oriented properly at the base 16 of the downhole 14. The cutting head drive 220 is then extended from the cutting head base 218, and rotary power is provided to the drill head assembly 222 to begin the cutting or drilling of the base passage 18. It will be seen that the telescoping components 218 and 220 may be constructed to provide sufficient extension of the drill head assembly 222 to form a sufficiently deep initial length of the base passage 18 to enable appropriate equipment to be used to form the remainder of the base passage 18, as discussed below. When such sufficient initial base passage depth has been formed, the drill head assembly 222 and anchor struts are retracted and the lateral cutting assembly 200 is withdrawn from the downhole in preparation for the next step in the operation.

At this point, the downhole drilling apparatus 100 illustrated in FIG. 8 is lowered into the downhole 14 in preparation for the next step in the excavation operation. It will be seen that the downhole drilling apparatus 100 may also be used to form the base passage 18 of an excavation, e.g., the base passage 18 shown in FIGS. 2 through 6 and 10 through 12B of the drawings. The steering assembly 104 (shown in FIG. 8) may be programmed or otherwise directed to guide the cutting or drilling portion 106 to form a closed, continuous circular or non-circular path extending from the initially formed portion of the base passage (as shown in its initialized configuration in FIG. 9) once it has been drilled or cut sufficiently deeply to allow for insertion of the drilling apparatus 100.

FIG. 10 provides an illustration of an apparatus 300 for making the base cut 24 after the base passage 18 has been formed by the downhole drilling apparatus 100. The base cut apparatus 300 includes a wire saw sheave 302 that is secured in a bracket or block 304. The bracket 304, in turn, is secured and guided by additional components. A selectively steerable, telescoping first drive assembly 306a extends from the first end of the bracket 304, and an opposite selectively steerable, telescoping second drive assembly 306b extends from the second end of the bracket 304. A first anchor 308a extends from the first drive assembly 306a opposite the bracket 304, and a second anchor 308b extends from the second drive assembly 306b opposite the bracket 304. Each of the drive assemblies 308a, 308b includes a plurality of radially opposed and selectively telescoping anchor struts 310 extending therefrom. The anchor struts 310 operate in the manner described further above for the anchor struts 110a and 110b of the apparatus 100 illustrated in FIG. 8, and the anchor struts 214 of the apparatus 200 illustrated in FIG. 9. A cable 312 provides electrical, hydraulic, and/or pneumatic power and operating signals to the base cutting apparatus 300, generally in the manner described further above for the cable 124 of the apparatus 100 of FIG. 8.

Additional guide pulleys are provided at the juncture of the downhole 14 and the base passage 18 to guide a wire saw 314 during cutting operations. The wire saw 314 is well known to those of ordinary skill in the art, comprising a flexible cable having a series of cutting elements attached thereto. The wire saw 314 extends down the downhole 14, which would be oriented normal to the plane of the FIG. 10 drawing sheet and the base passage 18 shown thereon. First and second guide pulleys 316a, 316b serve to turn the wire saw 314 elements substantially 90° at the base of the downhole 14, and third and fourth guide pulleys 316c, 316d guide the wire saw 314 elements to the wire saw sheave 302 installed in the base cut apparatus 300. The wire saw 314 comprises an endless loop of flexible cable that extends from a remotely located drive source (similar to that illustrated in FIG. 11 and described further below) and down the downhole 14 to pass around the first and third guide pulleys 316a, 316c, and defines a cutting element 314a that extends around the sheave 302 to define a return element 314b. The wire saw 314 then passes around the fourth and second guide pulleys 316d, 316b, and back through the downhole 14 to the remotely located drive source. The direction of travel of the wire saw 314 makes no difference in the case of non-directional cutting elements on the saw.

The advance of the wire saw sheave 302 is achieved by the anchor assemblies 308a, 308b in much the manner described further above for the downhole apparatus 100 of FIG. 8. The anchor struts 310 of the first anchor assembly 308a are retracted to release the anchor assembly within the base passage 18, and the telescoping first drive assembly 306a is extended to advance the first anchor assembly 308a along the base passage 18. The anchor struts 310 of the first anchor assembly 308a are then extended to lock the first anchor assembly 308 in place farther around the base passage 18. At this point, the anchor struts 310 of the second anchor assembly 308b are retracted to release the second anchor assembly 308b from the base passage 18, and the telescoping second drive assembly 306b is retracted to draw the second anchor assembly 308b toward the sheave 302 and bracket 304. The struts 310 of the second anchor assembly 308b are then extended to anchor the second anchor assembly 308b in place within the base passage 18. The first telescoping drive assembly 306a is then retracted, and the second telescoping drive assembly 306b is simultaneously extended. This advances the wire saw bracket 304 and its sheave 302 farther along the base passage 18, causing the wire saw element 314a to apply cutting pressure along the kerf being formed by the cutting operation, continuing the base cut. This incremental advance of the wire saw sheave 302 is continued until the base is cut completely across the base passage 18.

It will be seen that the length of the wire saw elements 314a, 314b define secants across the base of the excavation as the base cut is being made. The lengths of the secants vary from a minimum at the initiation of the cut to a maximum at the center of the cut, and back to a minimum at the end of the cut. Accordingly, a mechanism is provided to accommodate the change in length of the cable of the wire saw 314 during this cutting operation.

The two drive assemblies 306a, 306b may also include steering means in order to turn the drive assemblies 306a, 306b relative to their respective anchor assemblies 308a and 308b. It will be noted that the apparatus comprising the two anchor assemblies 308a, 308b, the two drive assemblies 306a, 306b, and the sheave bracket 304 defines a curved path within the base passage 18. This provides clearance from the inner wall of the base passage for the wire saw sheave 302 in the case of a curved passage, e.g., the passage 18. Moreover, while only a single base cut apparatus 300 is shown in FIG. 10 for simplicity in the drawing, it will be seen that two such devices 300 may be placed at the base of the downhole 14 to operate in opposite directions. This substantially doubles the speed of the formation of the base cut, since two wire saw elements are cutting from opposite directions to meet substantially in the center. As the two elements approach one another, one may be backed off to allow the second to complete the cut.

FIG. 11 provides an illustration of an apparatus used for forming the peripheral cut between the base passage 18 and the surface. The peripheral cutting apparatus 400 includes a stationary base 402 that remains external to the excavation, or at least to the inner portion of the excavation where several excavation stages are being made. The base 402 has a central portion 404 having opposite first and second ends 406a and 406b, and first and second arms 408a and 408b extending from the respective ends 406a, 406b. Each of the arms 408a, 408b has a first end 410a, 410b affixed to the corresponding end 406a, 406b of the base 402, and a second end 412a, 412b opposite the first end 410a, 410b. First and second telescoping anchor struts 411a extend from the first arm 408a, with third and fourth telescoping anchor struts 411b extending from the second arm 408b. These four struts 411a, 411b are similar to the struts, e.g., 110a, 110b of the apparatus 100 of FIG. 8, and serve to lock the base 402 in position in a larger excavation formed prior to the smaller and inner excavation shown being formed in FIG. 11.

A rotary drive shaft 414 extends from the central portion 404 of the base 402 between the two arms 408a and 408b. The selectively rotating shaft 414 supports a saw drive carrier 416 thereon opposite the central portion 404 of the base 402. The saw drive carrier 416 may comprise an elongate bar or the like extending diametrically from the rotary drive shaft 414, but, in any event, the saw drive carrier 416 has at least a first portion 418 extending radially from the rotary drive shaft 414.

A first saw drive adjuster 420 is installed upon the face of the first portion 418 of the saw drive carrier 416 opposite the central portion 404 of the base 402. The first saw drive adjuster 420 comprises a base cylinder 422 radially affixed to the saw drive carrier 416. A radius position adjuster ram 424 adjustably extends concentrically from the base cylinder 422. The distal end 426 of the ram 424 has a selectively telescoping, axially oriented cylinder 428 extending therefrom. The cylinder 428 carries a wire saw drive motor 430 thereon. A wire saw drive sheave 432 is disposed upon the drive shaft of the motor 430. The sheave 432 drives a wire saw 434 similar to the wire saw 314 of the apparatus 300 of FIG. 10. The selective rotation of the saw drive carrier 416, in combination with the selective extension or retraction of the radius position adjuster ram 424 and selective rotation of the cylinder 428 relative to the distal end 426 of the ram 424, allows the drive sheave 432 to be positioned at any practicable angle and radius from the axial center of the drive shaft 414 to enable the system to form circular or non-circular cuts, e.g., shapes or patterns such as those of FIGS. 7A through 7D, or others as desired.

The wire saw 434 extends around a driven sheave 436 that is located in the base passage 18 of the excavation. The driven sheave 436 may be a component of the base cut apparatus 300 illustrated in FIG. 10, but with the axis of the driven sheave 436 being turned 90° so that the wire saw 434 extends normal to the base passage 18 to make the peripheral cut, rather than coplanar with the base passage 18, as when making the base cut, as shown in FIG. 10.

The peripheral cut is formed by advancing the apparatus 300 about the base passage 18 while simultaneously rotating the saw drive carrier 416 in the base 402. The radius of the peripheral cut is determined by adjustment of the radius position adjuster ram 424. It will be seen that the peripheral cut need not be circular. Non-circular shapes may be cut by programming or otherwise adjusting the ram 424 radially inward or outward to match a previously formed non-circular base passage as the peripheral cut progresses according to rotation of the saw drive carrier 416 from the base 402 and travel of the apparatus 300.

When the base and peripheral cuts have been completed, the core C may be removed from the substrate S. This may be accomplished in various ways. FIGS. 12A and 12B illustrate one such system. In FIG. 12A, an inflatable core extractor bag or "balloon" 500 is shown installed in its uninflated state in the base passage previously formed in accordance with the apparatus of FIG. 10. The core extractor bag 500 is placed in position by first drawing it down the single downhole 14 using any appropriate means, and then installing it in the base passage in some manner, e.g., by using the base cut apparatus 300 illustrated in FIG. 10 with the wire saw 314 removed to pull the core extractor bag 500 into position. The core extractor bag 500 may be inflated either hydraulically or pneumatically, as desired. An inflation line 502 extends through the previously formed single downhole 14 from an inflation source external to the excavation to the core extractor bag 500. Additional mechanism for removing the cut block or core C from the substrate S may be provided by attaching a plate 504 to the external face of the core C, e.g., using a plurality of bolts 506, and applying tensile force by means of a cable(s) 508 attached to eyes or lugs 510 extending from the front face of the plate 504.

The core extractor bag 500 is shown in its inflated state in FIG. 12B. The fluid pressure developed in the core extractor bag 500 due to its inflation has caused the bag 500 to expand, thereby pushing the core C outward from the excavation. Tensile force may also be applied to the cable(s) 508 to draw the core C from the substrate S by means of the plate 504 and its attachment to the core C. The resulting distance between the substrate S at the bottom or base of the excavation and the bottom or base of the partially extracted core C provides sufficient room for the optional placement of another robotic device therein, e.g., the block cutting mechanism 600 of FIG. 13, discussed further below.

In some instances, it may be desirable to section the core C prior to its removal from the substrate S. This may be due to a desire to produce less massive blocks in order to facilitate their handling, or for some other reason. For example, the removal of the entire core C as a single monolithic unit will require the removal of all equipment behind the core C as well, which may not be practicable. FIG. 13 provides an illustration of a mechanism for cutting a smaller block B from the previously cut core C. This view is from the inner end of the partially removed core C, the core C having been partially removed from the substrate S by means of the apparatus 500 of FIGS. 12A and 12B and/or other means. The block cutting mechanism 600 comprises a sheave frame 602 having an open center area 604. A wire saw sheave 606 is supported on a diametric axle 608 within the open center 604 of the frame 602.

A plurality, e.g., four, selectively telescoping adjuster legs 610 extend outward and generally radially from the frame 602. The adjuster legs 610 may be adjusted independently of one another to move the frame 602 and the wire saw sheave 606 to maneuver the wire saw 314 in order to cut the block B from the core C. The distal end 612 of each adjuster leg 610 has two mutually opposed and selectively telescoping first and second anchor struts 614 extending therefrom. The axes of the anchor struts are normal to the plane of the frame 602. Only the first anchor struts 614 disposed opposite the core C and block B are illustrated in the view of FIG. 13. It will be seen that these anchor struts 614 are substantially identical to the anchor struts 710 illustrated in FIG. 14 for the block extractor apparatus or mechanism 700.

The block cutting apparatus or mechanism 600 receives power and operating signals from an electrical and/or hydraulic cable similar to, e.g., the cable 124 of FIG. 8. The cable is omitted in FIG. 13 for clarity in the drawing. The block cutting apparatus 600 is advanced along a predetermined cutting path by alternately extending at least one of the anchor struts 614 between the core C and block B being cut therefrom and the underlying back of the excavation, generally as shown for the block extractor mechanism 700 illustrated in FIG. 14. The remaining anchor strut(s) 614 are retracted to allow their respective adjuster leg(s) 610 to be repositioned axially and radially, as needed. The previously extended and locked anchor strut(s) 614 are then retracted to release them from the core C, block B, and substrate S, and their adjuster leg(s) 620 are repositioned as needed. These anchor struts 614 are then extended to lock between the core C, block B, and substrate S, and the adjuster legs 610 are adjusted to move the sheave frame 602 relative to the locked anchor struts 614 in order to reposition the sheave 606 for further cutting. The process is continued until the cut is completed.

When the cut separating the block B from the core C has been completed, the block B may be removed from the core C and substrate S. FIG. 14 provides an illustration of a block extractor apparatus or mechanism 700 used to push the block B from the core C and/or substrate S. The block extractor apparatus 700 comprises a hydraulic base 702 having a perimeter 704, and a plurality of selectively telescoping adjuster legs 706 extending adjustably from the base perimeter 704. Each of the legs 706 has a distal end 708 having mutually opposed first and second anchor struts 710 extending therefrom normal to the plane of the base 702. One or more concentrically telescoping hydraulic rams, e.g., first through third rams 712a, 712b, and 712c, selectively extend from the hydraulic base 702. The extension axis of each ram 712a, 712b, 712b is normal to the plane of the base 702 and the adjuster legs 706.

The block extractor 700 is positioned between the completely cut block B and the substrate S behind the block B using substantially the same procedure described further above when positioning other apparatus in the base passage 18 or widened space between the core C and substrate S. Hydraulic and/or electrical power and control signals may be provided by means of a cable 714 extending from the hydraulic base 702 to a remotely located power and control system external to the excavation. The hydraulic rams 721a, 712b, and 712c are then provided with hydraulic pressure to extend them telescopically from the base 702, thereby forcing the previously cut block B from the surrounding core C and/or substrate S. It will be seen that this mechanism 700 may also be used in the removal of the entire core C from the surrounding substrate S in lieu of the core extractor bag 500 of FIGS. 12A and 12B. Additional mechanism for removing the cut block B from the core C and/or substrate S may be provided by attaching an extractor plate 716 to the external face of the block B, e.g., using a plurality of bolts 718, and applying tensile force by means of a cable 720 attached to an eye or lug 722 extending from the front face of the plate 716. The extractor plate 716 may be identical to the extractor plate 504 of FIGS. 12A and 12b, e.g., having multiple eyes or lugs extending therefrom for multiple cable attachment.

It is to be understood that the present invention is not limited to the embodiments described above, but encompasses any and all embodiments within the scope of the following claims.

We claim:

1. A kit of apparatus for performing wire saw excavation, comprising:
   a boring machine for forming a downhole and a base passage in a substrate;
   a robotic excavator for at least initiating the base passage;
   an apparatus for making a base cut to define a bottom surface of a core;
   an apparatus for making a peripheral cut between the base cut and a ground surface;
   an apparatus for removing the core from the substrate;
   an apparatus for sectioning the core into a smaller block before removal of the core from the substrate; and
   an apparatus for extracting the smaller block from the core before removal of the core from the substrate.

2. The kit of apparatus for performing wire saw excavation according to claim 1, wherein said boring machine comprises:
   a first drive component having a plurality of selectively telescoping anchor struts extending radially therefrom;
   a second drive component disposed concentric to the first drive component, the second drive component selectively telescoping around the first drive component, the second drive component having a plurality of selectively telescoping anchor struts extending radially therefrom;
   a steering assembly extending concentrically from the second drive component opposite the first drive component, the steering assembly comprising:
      a base;
      a plurality of selectively telescoping legs extending from the base opposite the second drive component; and
      a steering head extending from the legs opposite the base;
   a rotary cutting head drive extending from the steering head opposite the legs; and
   a drill head assembly mounted on the cutting head drive opposite the steering head.

3. The kit of apparatus for performing wire saw excavation according to claim 1, wherein said apparatus for making a base cut comprises:
   a first anchor having a plurality of opposed, selectively telescoping anchor struts extending radially therefrom;
   a selectively steerable telescoping first drive link assembly extending from the first anchor;
   a sheave and bracket assembly extending from the first drive link assembly opposite the first anchor;
   a wire saw disposed about the sheave of the sheave and bracket assembly;
   a selectively steerable telescoping second drive link assembly extending from the sheave and bracket assembly opposite the first drive link assembly; and
   a second anchor extending from the second drive link assembly opposite the sheave and bracket assembly, the second anchor having a plurality of opposed, selectively telescoping anchor struts extending radially therefrom.

4. The kit of apparatus for performing wire saw excavation according to claim 1, wherein said robotic excavator comprises:
   a frame having a central portion having opposed first and second ends, the frame having first and second arms extending normal to the first and second ends, respectively, the arms having opposed first and second ends;
   a selectively telescoping anchor strut extending from each of the ends of each of the arms;
   at least one selectively telescoping ram extending from the central portion of the frame between the arms;
   a rotary cutting head drive extending from the at least one ram opposite the central portion of the frame; and
   a drill head assembly extending from the cutting head drive opposite the at least one ram.

5. The kit of apparatus for performing wire saw excavation according to claim 1, wherein said apparatus for making a peripheral cut comprises:
   a base having a central portion defining opposed first and second ends, the base having first and second arms extending normal to the first and second ends, respectively, the arms having opposed first and second ends;
   a rotary drive extending from the central portion of the base;
   a saw drive carrier extending from the rotary drive opposite the central portion of the base, the saw drive carrier having a radially extending first portion;
   a selectively telescoping first saw drive adjuster disposed upon the first portion of the saw drive carrier opposite the base, the first saw drive adjuster having:
      a base cylinder immovably affixed radially upon the saw drive carrier;
      a radius position adjuster ram adjustably extending from the base cylinder, the radius position adjuster ram having a distal end; and
      a selectively telescoping axial cylinder disposed upon the distal end of the radius position adjuster ram;
      a drive motor disposed upon the axial cylinder; and
      a wire saw drive sheave selectively driven by the drive motor.

6. The kit of apparatus for performing wire saw excavation according to claim 1, wherein said apparatus for removing the core from the substrate comprises:
   a selectively inflatable core extractor bag; and
   an inflation line communicating fluidly with the core extractor bag.

7. The kit of apparatus for performing wire saw excavation according to claim 1, wherein said apparatus for sectioning the core into a smaller block comprises:
   a sheave frame having an open center;
   a wire saw pulley disposed within the open center of the sheave frame;
   a plurality of selectively telescoping adjuster legs extending radially from the sheave frame, each of the adjuster legs having a distal end; and
   opposed selectively telescoping first and second anchor struts extending from the distal end of each of the adjuster legs.

8. The kit of apparatus for performing wire saw excavation according to claim 7, wherein said apparatus for extracting the smaller block comprises:
   a hydraulic base having a perimeter;
   a plurality of selectively telescoping adjuster legs extending radially from the perimeter of the hydraulic base, each of the adjuster legs having a distal end;
   opposed selectively telescoping first and second anchor struts extending from the distal end of each of the adjuster legs; and
   at least one hydraulic ram extending from the hydraulic base normal to the adjuster legs.

* * * * *